(12) United States Patent
Karve et al.

(10) Patent No.: US 9,483,540 B2
(45) Date of Patent: Nov. 1, 2016

(54) CLOUD BASED DATA MIGRATION AND REPLICATION

(71) Applicant: International Business Machines Corporation, Armonk, NY (US)

(72) Inventors: Shrikant V. Karve, Pune (IN); Janmejay S. Kulkarni, Navi Mumbai (IN); Sarvesh S. Patel, Yeola (IN); Ashish R. Pathak, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/749,852

(22) Filed: Jun. 25, 2015

(65) Prior Publication Data

US 2015/0302071 A1 Oct. 22, 2015

Related U.S. Application Data

(63) Continuation of application No. 13/733,953, filed on Jan. 4, 2013, now Pat. No. 9,075,529.

(51) Int. Cl.
*G06F 15/16* (2006.01)
*G06F 17/30* (2006.01)
*G06F 3/06* (2006.01)
(Continued)

(52) U.S. Cl.
CPC ....... *G06F 17/30575* (2013.01); *G06F 3/0619* (2013.01); *G06F 11/1402* (2013.01); *G06F 11/2094* (2013.01); *G06F 17/30312* (2013.01); *H04L 67/108* (2013.01); *H04L 67/1095* (2013.01); *G06F 3/067* (2013.01); *G06F 21/31* (2013.01)

(58) Field of Classification Search
None
See application file for complete search history.

(56) References Cited

U.S. PATENT DOCUMENTS

2008/0168526 A1* 7/2008 Robbin ............ G06F 17/30174
725/139
2010/0199042 A1 8/2010 Bates et al.
(Continued)

FOREIGN PATENT DOCUMENTS

WO WO2012/042509 A1 4/2012

OTHER PUBLICATIONS

U.S. Appl. No. 13/733,953.
(Continued)

*Primary Examiner* — Oluwatosin Gidado
(74) *Attorney, Agent, or Firm* — Stephen R. Tkacs; Stephen J. Walder, Jr.; Randall J. Bluestone

(57) ABSTRACT

A mechanism is provided in a data processing system for data replication. The mechanism divides a set of data to be replicated into a plurality of slices. Each slice of the plurality of slices is to be copied from a primary site to a master secondary site within a plurality of secondary sites. The plurality of secondary sites comprises the master secondary site and at least one subsidiary peer site. The mechanism copies the plurality of slices from the primary site to the plurality of secondary sites such that the master secondary site stores a first slice of the set of data and each of the at least one subsidiary peer site stores a corresponding slice of the set of data. Responsive to completion of copying the plurality of slices to the plurality of secondary sites, for each of the at least one subsidiary peer site, the mechanism initiates copying of the corresponding slice of the set of data to the master secondary site.

20 Claims, 10 Drawing Sheets

(51) Int. Cl.
*G06F 11/20* (2006.01)
*H04L 29/08* (2006.01)
*G06F 11/14* (2006.01)
*G06F 21/31* (2013.01)

(56) References Cited

U.S. PATENT DOCUMENTS

| | | |
|---|---|---|
| 2010/0332456 A1 | 12/2010 | Prahlad et al. |
| 2011/0078405 A1* | 3/2011 | Asano ............... G06F 3/0607 |
| | | 711/170 |
| 2011/0264786 A1 | 10/2011 | Kedem et al. |
| 2012/0030175 A1 | 2/2012 | Massar et al. |
| 2012/0047339 A1* | 2/2012 | Decasper ........... G06F 11/1076 |
| | | 711/162 |
| 2012/0233406 A1* | 9/2012 | Igashira ............. G06F 12/0804 |
| | | 711/118 |
| 2012/0246429 A1* | 9/2012 | Arakawa ............ G06F 11/2064 |
| | | 711/162 |
| 2013/0204849 A1* | 8/2013 | Chacko ................ G06F 3/0604 |
| | | 707/692 |

OTHER PUBLICATIONS

Abu-Libdeh, Hussar at al., "RACS: A Case for Cloud Storage Diversity", SoCC'10, Indianapolis IN, 2010, http://www.cs.cornell.edu/~hweather/publications/racs-socc2010.pdf, Jun. 10-11, 2010, 11 pages.

* cited by examiner

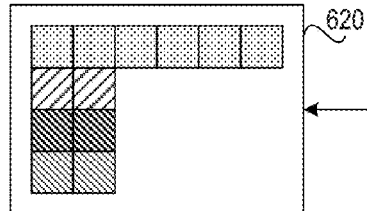
MASTER SECONDARY SITE 620
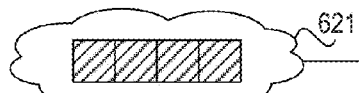
SECONDARY PONTOON SITE 1 621
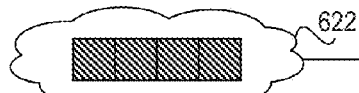
SECONDARY PONTOON SITE 2 622
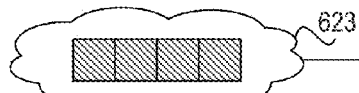
SECONDARY PONTOON SITE 3 623
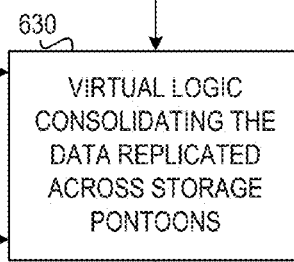
630 VIRTUAL LOGIC CONSOLIDATING THE DATA REPLICATED ACROSS STORAGE PONTOONS
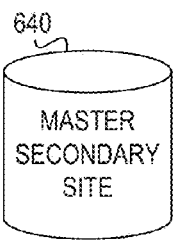
640 MASTER SECONDARY SITE
*FIG. 6*
*FIG. 7*
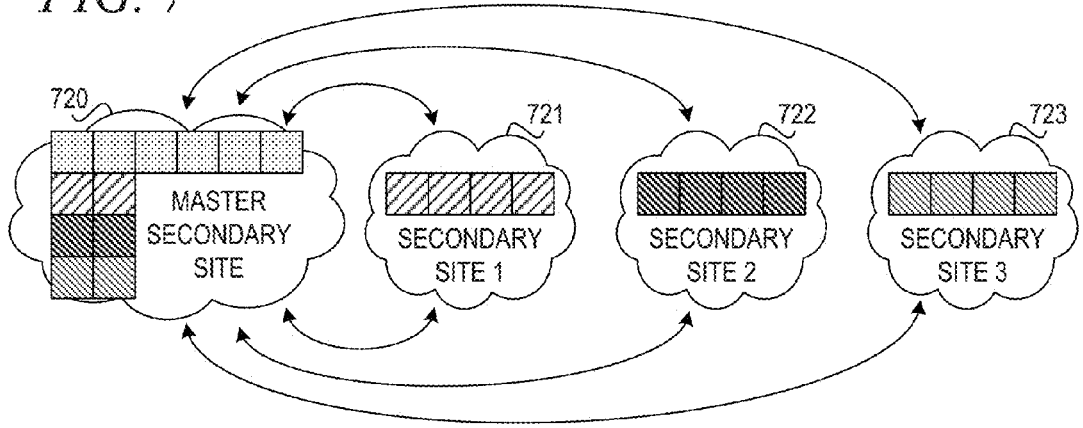

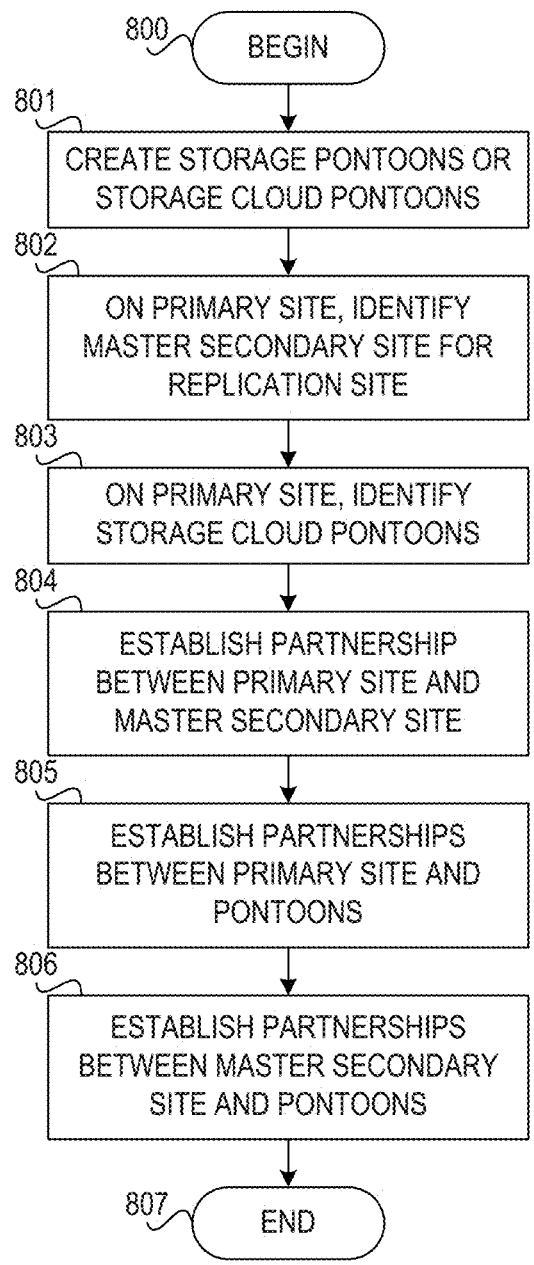

CLOUD BASED DATA MIGRATION AND REPLICATION

BACKGROUND

The present application relates generally to an improved data processing apparatus and method and more specifically to mechanisms for cloud based data migration and replication.

Cloud computing is the use of computing resources (hardware and software) that are delivered as a service over a network (typically the Internet). Cloud computing entrusts remote services with a user's data, software and computation. Using software as a service, users also rent application software and databases. The cloud providers manage the infrastructure and platforms on which the applications run. End users may access cloud-based applications through a web browser or a light-weight desktop or mobile app while the business software and user data are stored on servers at a remote location.

Cloud services today are taking center stage in providing numerous services like infrastructures, applications, storage, etc. Cloud storage is basically a networked online storage, which can be bought or leased according to storage needs. The entities using the storage cloud are not concerned about how the space is made available to them, but more about whether the guaranteed space is made available or not. Another concern is the privacy of the data and sense of acknowledgement that if the data is stored on such cloud storage, it remains secure. This becomes more important if one copies or replicates critical data or production data to a remote site to meet business continuity requirements. It is also important that the production data be copied to the remote site as quickly as possible while meeting the available bandwidth and cost requirements.

Cloud storage services are becoming more and more common and can be leveraged to copy data to the nearest location during network contention and then copy the data to the remote location over a period of time. Security and privacy are major concerns in the deployments as described above. It may be possible for a person sitting at one of the cloud storage sites to get a peer view on production or primary data that might contain confidential or personal information.

SUMMARY

In one illustrative embodiment, a method, in a data processing system, is provided for data replication. The method comprises dividing a set of data to be replicated into a plurality of slices. Each slice of the plurality of slices is to be copied from a primary site to a master secondary site within a plurality of secondary sites. The plurality of secondary sites comprises the master secondary site and at least one subsidiary site. The method further comprises copying the plurality of slices from the primary site to the plurality of secondary sites such that the master secondary site stores a first slice of the set of data and each of the at least one subsidiary peer site stores a corresponding slice of the set of data. Responsive to completion of copying the plurality of slices to the plurality of secondary sites, the method further comprises for each of the at least one subsidiary peer site, initiating copying of the corresponding slice of the set of data to the master secondary site.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 illustrates consolidated read-only logic providing a view of data from the secondary sites while allowing pontoon sites to copy data to the master secondary site in accordance with an illustrative embodiment;

FIG. 7 illustrates a view of copy and read-only operations between pontoon sites and the master secondary site in accordance with an illustrative embodiment;

FIG. 8 is a flowchart illustrating operation of a mechanism for establishing partnerships between a primary site, pontoon sites, and a master secondary site in accordance with an illustrative embodiment;

DETAILED DESCRIPTION

Figure 1:
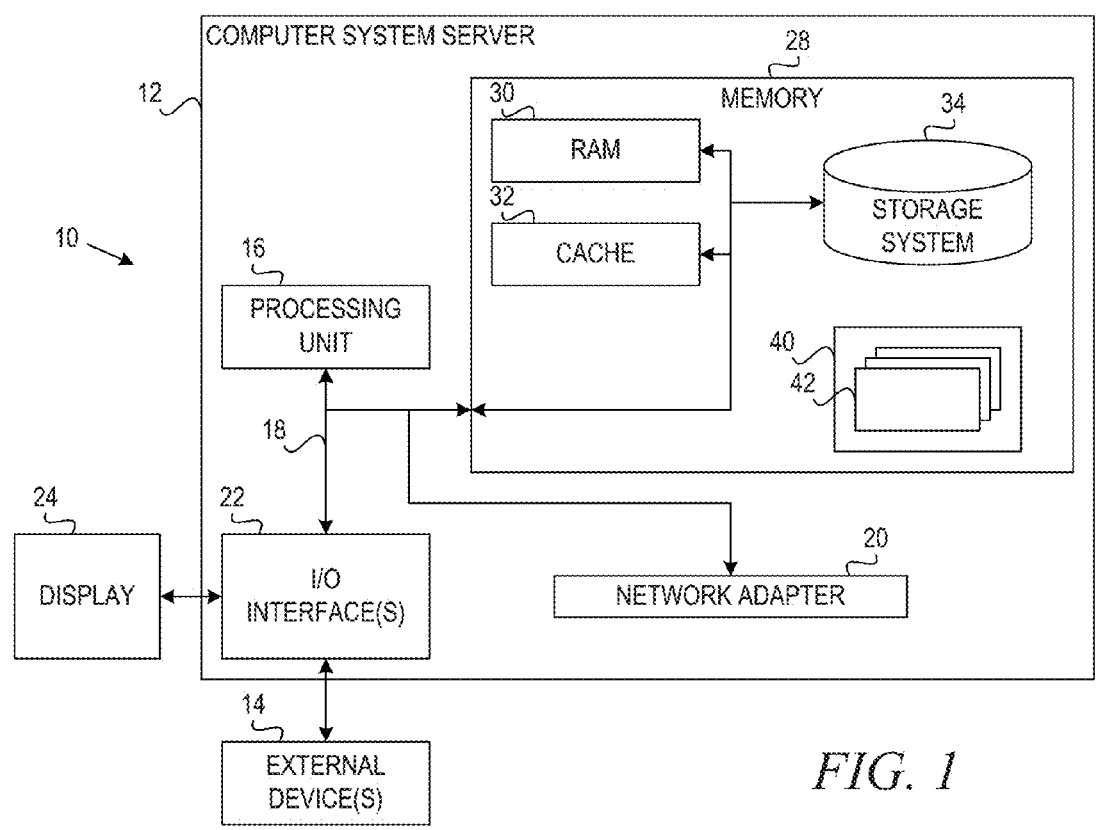
FIG. 1 depicts a cloud computing node according to an illustrative embodiment.

The illustrative embodiments provide a mechanism for data security and confidentiality during remote replication across storage clouds. The mechanism may create or identify independent storage clouds, or "pontoons," as equal stake holders and relay split information of the primary data or production data across all pontoons to a master secondary site. A pontoon site is a subsidiary peer site that participates in migration or replication of data from a primary site to a master secondary site without storing the entirety of the data. Each cloud or pontoon may act as a "stepping stone" in the replication process. The primary data or production information may then be viewed at the remote site, which consolidates the views from the independent storage clouds or pontoons and presents a single view of the data scattered across the clouds until all data are copied from each pontoon site to the master secondary site. Because each pontoon has a qualified subset of data and not the entire set of data to the third party or any person accessing a pontoon site, the data would only appear as random bits. The mechanism also attempts to solve the problem of large time required for initial synchronization by replicating portions of primary data across pontoon sites thereby reducing the load of data to be copied from a single site to another single remote site. The mechanism may be used to replicate or migrate multiple primary images to a single master secondary site or multiple master secondary sites.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization, it may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
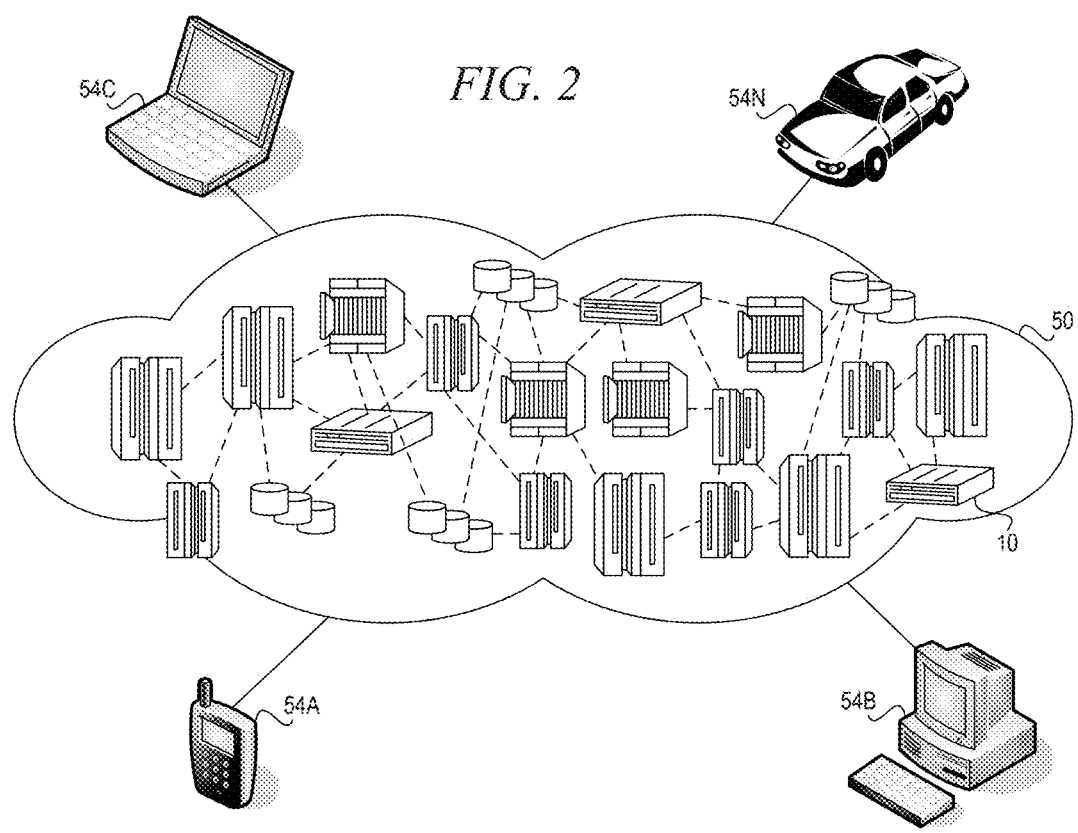
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
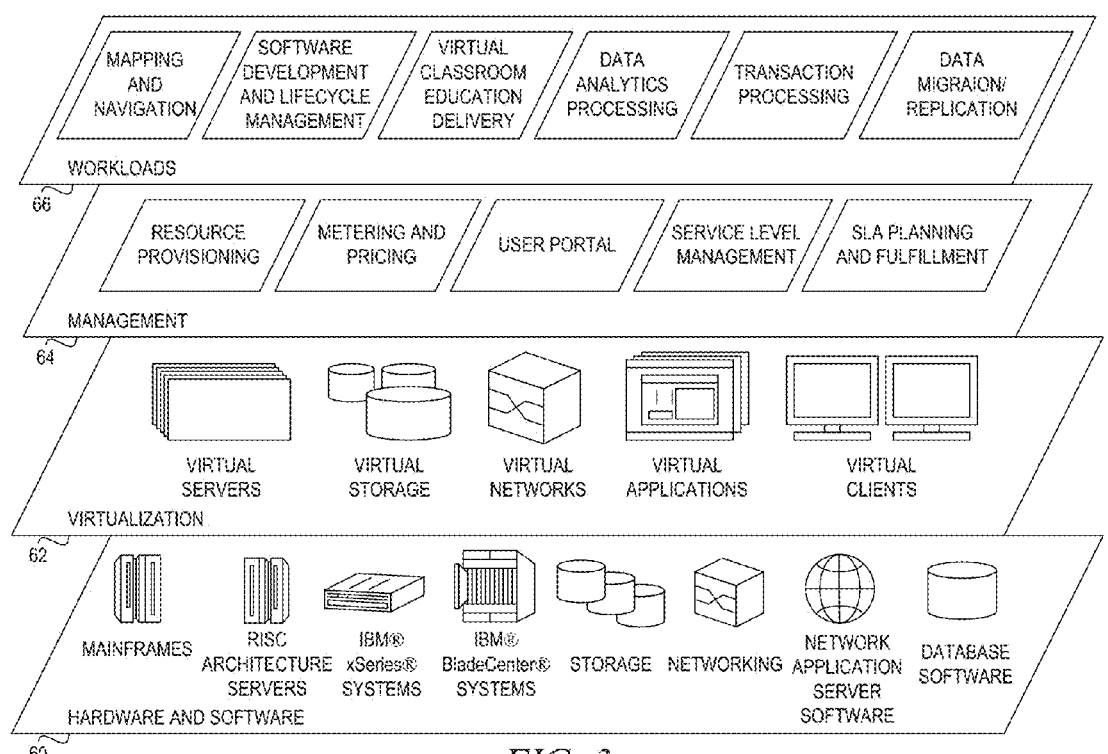
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; and data analytics processing; transaction processing; and data migration/replication.

The storage cloud is basically a networked online storage available for any qualified entity or entities to use allocated space according to requirements. The enterprise organizations must replicate production data or critical information to a remote site so that during disaster situations the data can be recovered. However, while replicating data across multiple data centers spread across multiple sites, the data replication rate is limited to the bandwidth and speed of the available inter-site link. For higher bandwidths, higher costs are to be borne by the organization, and for large data to be replicated to the secondary site, the replication time is long.

The illustrative embodiments attempt to solve the problem of fast data availability at the secondary site without having to wait for the entire initial synchronization to happen. The illustrative embodiments also attempt to solve the problem of data security by not adding an overhead of encryption. The illustrative embodiments split data across available pontoon sites. Even if a party does have access to the data, it will not be complete; the party has only partial access.

The illustrative embodiments allow the usage of existing public or qualified storage clouds acting as pontoons, as potential stake holders in the operation. A pontoon site is a subsidiary peer site that participates in migration or replication of data from a primary site to a master secondary site without storing the entirety of the data. The illustrative embodiments require the administrator at the time of establishing partnerships with remote sites to identify the available pontoon sites. The pontoon sites are paid or public storage clouds that provide qualified storage or usage space on-demand, as reserved, or as determined by agreements between the entity and the storage cloud providers. The administrator establishes partnerships between the primary site and qualified secondary site, as well as between the primary site and the pontoon sites and between the pontoon sites and the secondary site.

During this process, the administrator must identify the remote site, which would act as a master secondary site. The master secondary site provides a consolidated view to the host/servers accessing the data being replicated. Once the respective slices of primary data are replicated to each of the pontoon site and the master secondary site, the master secondary site enables the consolidated read view, which provides the read-only view of the primary data, sections of which are pulled from each pontoon site. While this read-only view is available, the relationship exists in a synchronized tri-state where the data is copied to pontoon sites but is yet to be copied from each of the pontoon sites to the master secondary site.

The illustrative embodiments require that the administrator identify the pontoon sites. A pontoon is a stepping stone. The illustrative embodiments use this concept in replication of primary data across different pontoons and consolidation of this data at a remote site. A pontoon site can be a storage array or a network attached storage (NAS) box or storage cloud. A pontoon site is a subsidiary peer site that participates in migration or replication of data from a primary site to a master secondary site without storing the entirety of the data.

Figure 4:
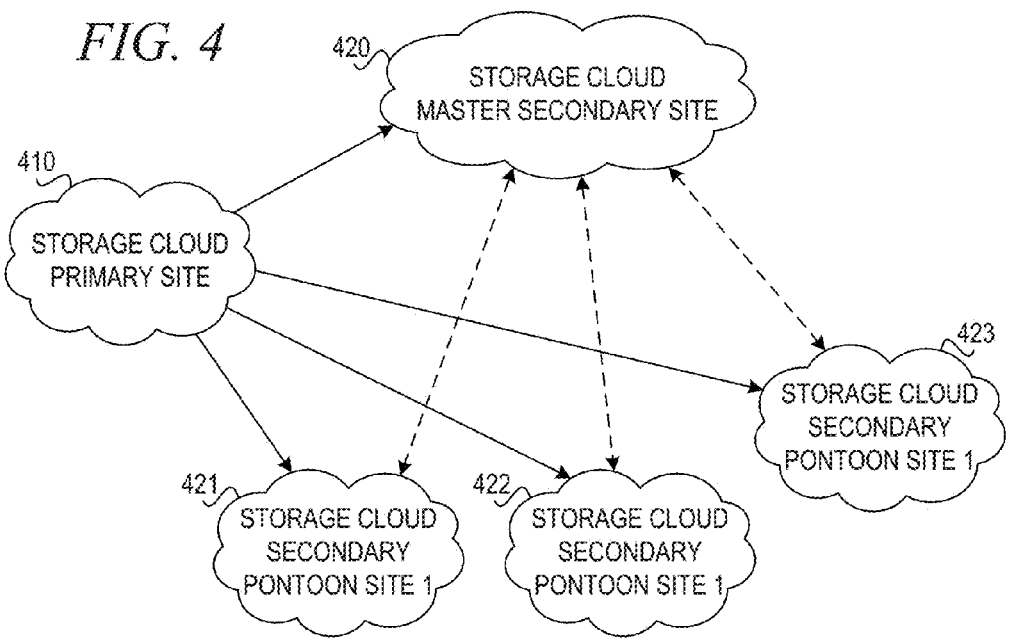
FIG. 4 depicts an example deployment of a system for data migration and replication in accordance with an illustrative embodiment.

FIG. 4 depicts an example deployment of a system for data migration and replication in accordance with an illustrative embodiment. Storage cloud primary site 410 migrates or replicates data to storage cloud master secondary site 420. An administrator establishes partnerships between the primary site 410 and the master secondary site 420, as well as between the primary site 410 and storage cloud secondary pontoon sites 421-423 and between the pontoon sites 421-423 and the master secondary site 420.

Storage cloud primary site 410 replicates a portion of the data to the master secondary site 420 and concurrently replicates portions of the data to pontoon sites 421-423. Once primary site 410 replicates the data to master secondary site 420 and pontoon sites 421-423, master secondary site 420 may enable a consolidated view such that a client can view the data as if the entire data were present at master secondary site 420. Ultimately, pontoon sites 421-423 replicate the portions of the data to master secondary site 420 until the data are completely replicated to master secondary site 420.

Figure 5:
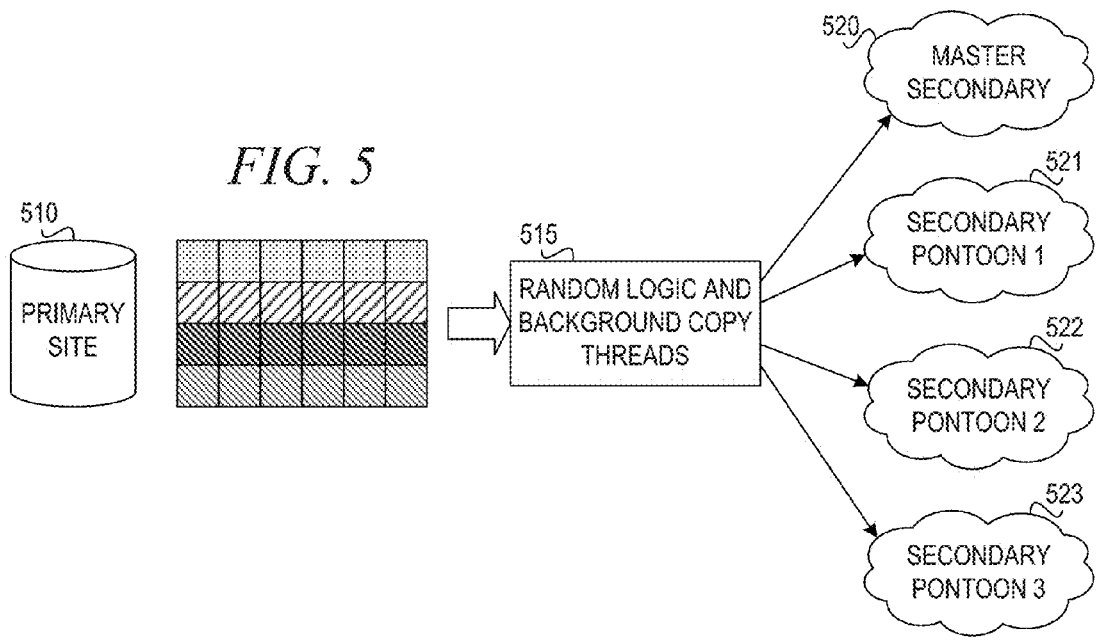
FIG. 5 illustrates splitting data across a master secondary site and a set of secondary pontoon sites in accordance with an illustrative embodiment.

FIG. 5 illustrates splitting data across a master secondary site and a set of secondary pontoon sites in accordance with an illustrative embodiment. Primary site 510 divides the data to be migrated or replicated into a number of slices in a bitmap. Each slice represents a site participating in replication. For example, if there are four sites, including the master site, then the bitmap will include four slices. Random logic and background copy threads 515 define how the slices are copied from primary site 510 to master secondary site 520 and secondary pontoon sites 521-523. Each slice has blocks of data on the bitmap to be copied to its respective site.

FIG. 6 illustrates consolidated read-only logic providing a view of data from the secondary sites while allowing pontoon sites to copy data to the master secondary site in accordance with an illustrative embodiment. Master secondary site 620 initially stores a respective stripe of data replicated or migrated from a primary site (not shown). Secondary pontoon sites 621-623 also initially store respective stripes of data from the bitmap of the data to be replicated. Virtual logic 630 consolidates the data replicated across the storage pontoons. Virtual logic 630 allows master secondary site 620 to provide a consolidated read-only view of the data, even though the data has not yet been fully replicated from pontoon sites 621-623 to master secondary site 620. Virtual logic 630 provides the read-only view 640 of the master secondary site to clients.

FIG. 7 illustrates a view of copy and read-only operations between pontoon sites and the master secondary site in accordance with an illustrative embodiment. An administrator establishes partnerships between master secondary site 720 and secondary sites 721-723. Master secondary site 720 may communicate with secondary sites 721-723 to migrate data blocks from secondary sites 721-723 to master secondary site 720. Concurrently, before migration of data blocks to master secondary site 720 is completed, master secondary site 720 may communicate with secondary sites 721-723 to provide a read-only view of the data.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function. In a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 8 is a flowchart illustrating operation of a mechanism for establishing partnerships between a primary site, pontoon sites, and a master secondary site in accordance with an illustrative embodiment. Operation begins (block 800), and an administrator identifies and creates storage pontoons or storage cloud pontoons (block 801). The mechanism creates a storage pontoon by first identifying the master secondary site and then identifying private/public storage clouds (acting as pontoons) that will participate in the replication process. On the primary site, an administrator identifies a master secondary site to which data are to be replicated or migrated (block 802). An administrator identifies participating private or public storage pontoon or storage cloud pontoon sites (block 803).

An administrator then establishes a partnership between the primary site and the master secondary site (block 804). An administrator also establishes partnerships between the primary site and the pontoons (block 805). An administrator establishes partnerships between the master secondary site and the pontoon sites (block 806). Thereafter, operation ends (block 807).

The operation requires that all the storage sites can be managed dynamically from a single or multiple management interfaces that can create/modify/delete the available storage space and, if required, perform advanced operations. This also assumes that proper authentication procedures are in place and then the partnerships are established.

Secondary sites comprise a master secondary site and one or more pontoon sites. A pontoon site is a participating storage or storage cloud participating in the replication process. The master secondary site is the replication site at which the primary image is to be replicated. Until all the data from the pontoon sites reach the master secondary site, the logic at the master secondary site provides a consolidated read view once all the data of respective slices are copied to the secondary sites. A slice (S) comprises chunks of data blocks of the primary image to be copied to the participating sites. A unit of data is the space of each logical unit number (LUN), logical volume, virtual disk, physical disk, space, folder, or file participating in the replication as a primary image. A unit may comprise multiple LUNs or storages participating in the replication process at primary.

A slice length (SS) is the length or the number of data blocks of the primary image (of each unit) that is to be copied to the respective secondary site. Slice length is particularly important on a per-pontoon site basis, as depending on the available storage on that slice, the length may be adjusted or varied. The total number of sites (N) includes all of the participating sites, excluding the primary site. That is, the total number of sites includes the master secondary site and the secondary pontoon sites. The available space (AS) is the available space on each pontoon site.

Figure 9A:
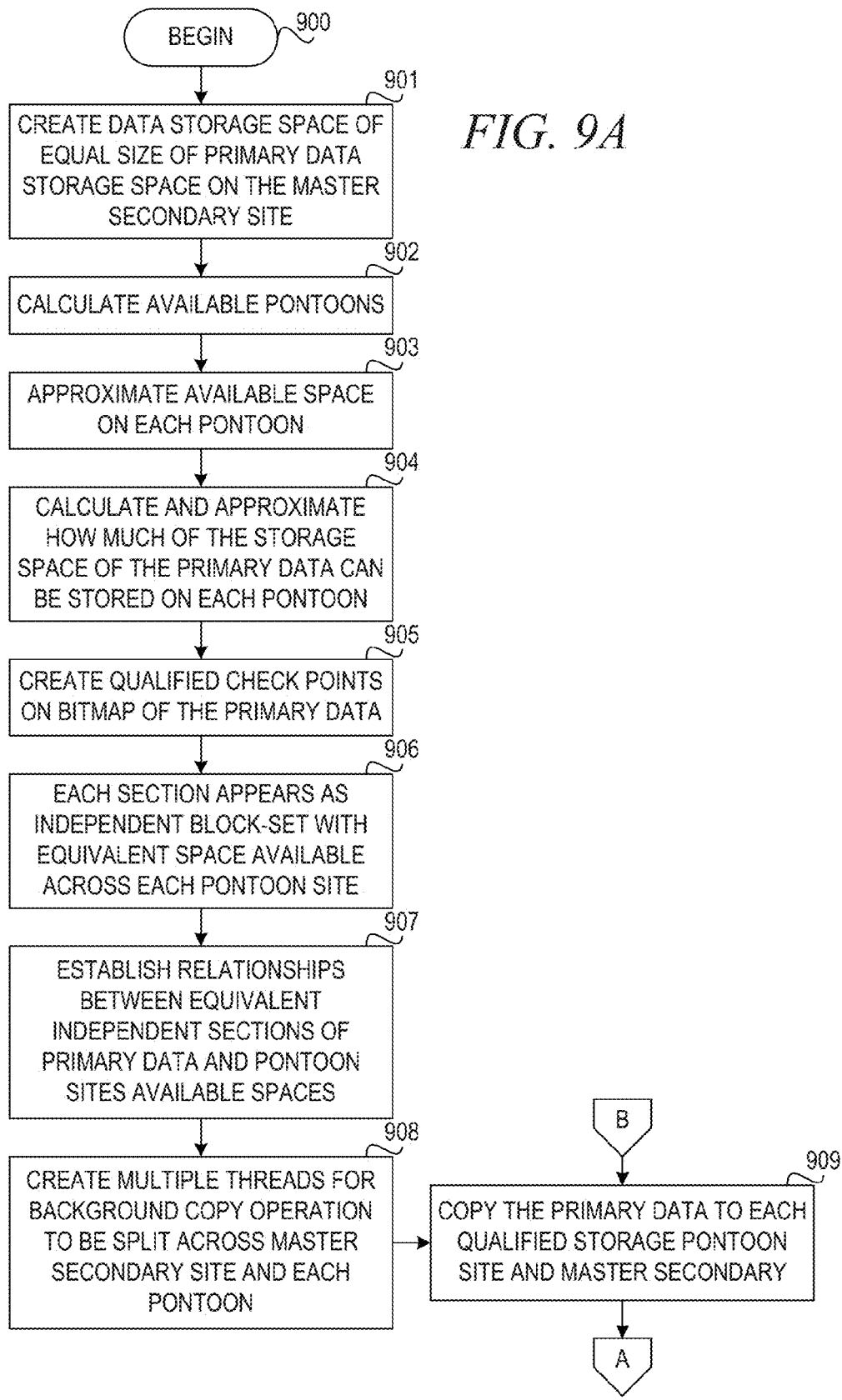
FIGS. 9A and 9B show a flowchart illustrating operation of a mechanism for background copy and consolidated read view in accordance with an illustrative embodiment.
Figure 9B:
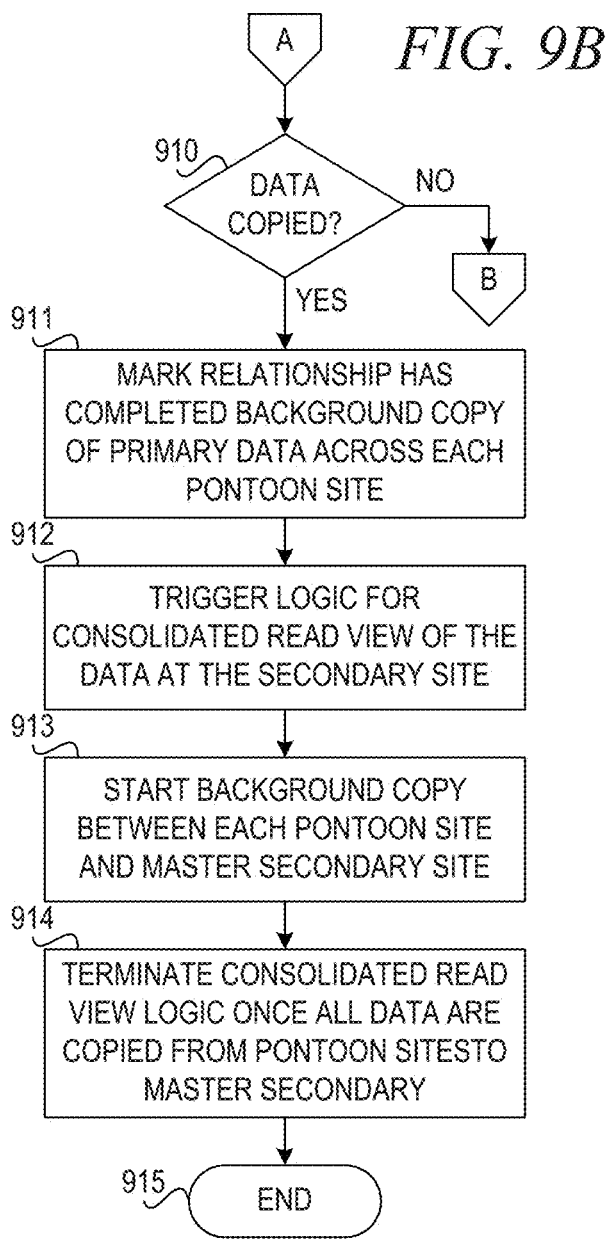

FIGS. 9A and 9B show a flowchart illustrating operation of a mechanism for background copy and consolidated read view in accordance with an illustrative embodiment. With reference to FIG. 9A, operation begins (block 900), and the mechanism creates data storage space of equal size of the primary data storage space on the master secondary site (block 901). The mechanism calculates available pontoon sites (block 902) and approximates the available space on each pontoon site (block 903). The mechanism then calculates and approximates how much of the storage space of the primary data can be stored on each pontoon site (block 904).

The mechanism creates qualified check points on the bitmap of the primary data (block 905). Each section appears as an independent block-set with equivalent space available across each pontoon site (block 906). The mechanism establishes relationships between equivalent independent sections of the primary data and available spaces of the pontoon sites (block 907). The mechanism then creates multiple threads for background copy operation to be split across the master secondary site and the pontoon sites (block 908). The mechanism copies the primary data to each qualified storage pontoon site and master secondary site (block 909).

Thereafter, turning to FIG. 9B, the mechanism determines whether the data for a qualified section has been copied to each pontoon site (block 910). If the data has not been copied to each pontoon site, operation returns to block 909 in FIG. 9A to copy primary data to the secondary sites.

If the data has been copied to each pontoon site in block 910, the mechanism marks the relationship has completed background copy of the primary data across each pontoon site (block 911). Then, the mechanism triggers logic for the consolidated read view of the data at the master secondary site (block 912). The mechanism starts background copy between each pontoon site and the master secondary site (block 913). Once all data are copied from the pontoon sites to the master secondary site, the mechanism terminates the consolidated read view logic (block 914). Thereafter, operation ends (block 915).

Figure 10A:
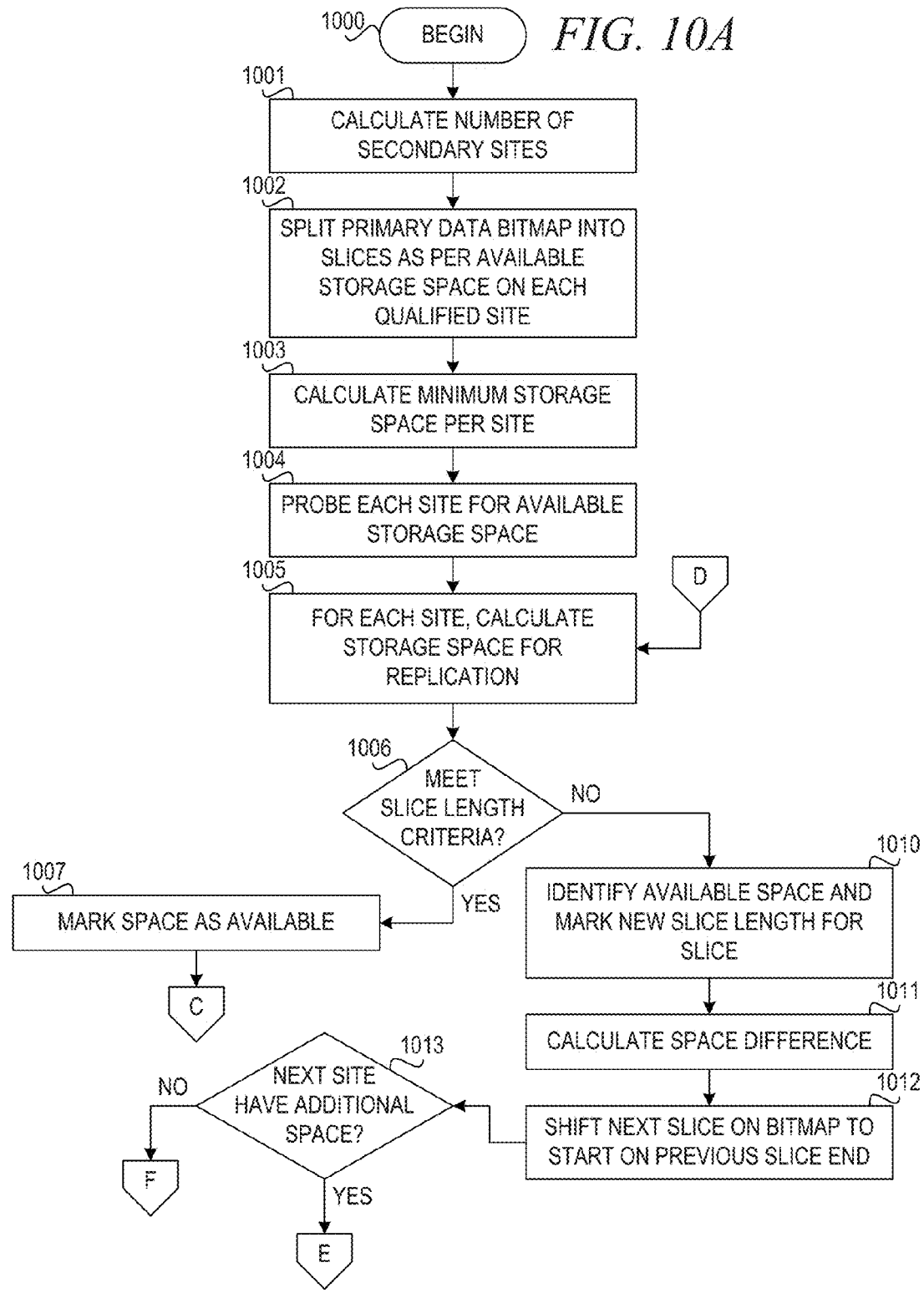
FIGS. 10A and 10B show a flowchart illustrating operation of a mechanism for slice calculation and pontoon site space allocation in accordance with an illustrative embodiment.
Figure 10B:
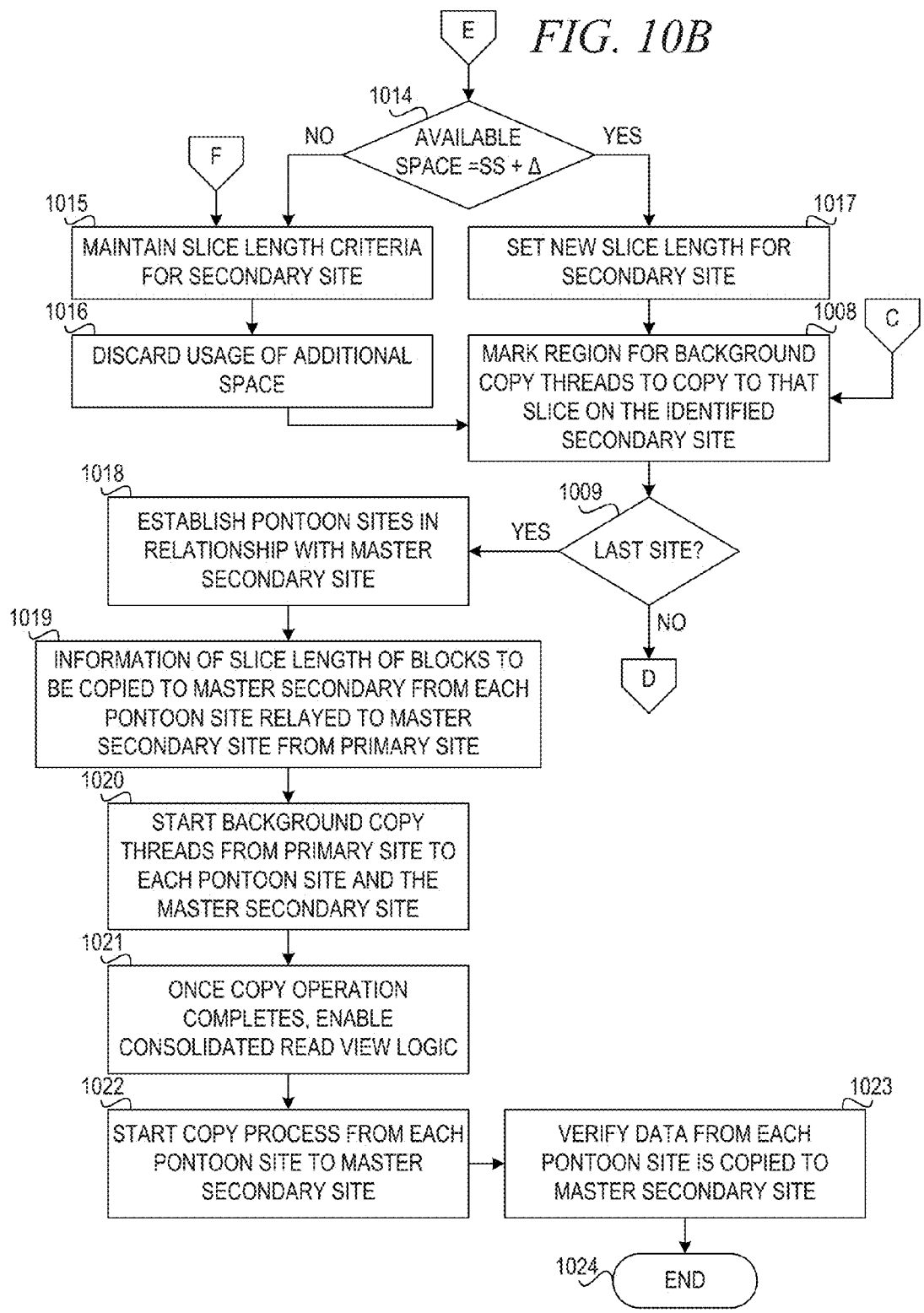

FIGS. 10A and 10B show a flowchart illustrating operation of a mechanism for slice calculation and pontoon site space allocation in accordance with an illustrative embodiment. With reference to FIG. 10A, operation begins (block 1000), and the mechanism calculates the number of secondary sites, including the master secondary site and the subsidiary peer (pontoon) sites (block 1001). The mechanism splits a primary data bitmap into slices as per available storage space on each qualified secondary site (block 1002). The number of slices (S) may be equal to the number (N) of secondary sites, including a master secondary site to which the data are to be migrated or replicated and a set of subsidiary peer storage sites. For example, if there are three subsidiary peer (pontoon) sites and one master secondary site, then the number of slices is four.

The mechanism calculates the minimum storage space (SS) per site (block 1003). The minimum storage space is the primary image space (PS) divided by the number of sites. For example, if the primary data are 40 GB and the number of sites is four, then each slice length is 10 GB. The mechanism probes each secondary site for available storage space (block 1004). The probes provide the available space (AS) per pontoon site.

For each secondary site, the mechanism calculates the storage space for replication (block 1005). The mechanism then determines whether the minimum storage space meets the slice length (SS) criteria (block 1006). If the minimum storage space meets the slice length criteria, the mechanism marks the slice length storage space as available on the site (block 1007). Then, operation proceeds to block 1008 in FIG. 10B to mark the region for background copy threads to copy to that slice on the identified secondary site. The mechanism then determines whether the site is the last secondary site (block 1009). If the site is not the last secondary site, operation returns to block 1005 in FIG. 10A to calculate the storage space for replication for the next site.

If the available storage space of the secondary site does not meet the slice length requirement in block 1006, the mechanism identities available space and marks a new slice length for the slice corresponding to the secondary pontoon site (block 1010). The master secondary site will always have the entire storage space for the primary volume, but the participating storage clouds may or may not have the required space for storing the slices. The mechanism calculates the space difference (block 1011) and shifts the next slice on the bitmap to start on the previous slice end (block 1012).

Next, the mechanism determines whether the next site has additional space (block 1013). If the next site has additional space, turning to FIG. 10B, the mechanism determines whether the available space is equal to the slice length plus the space difference (block 1014). If the available space is not equal to the slice length plus the difference, or if the next site does not have additional space in block 1013, the mechanism maintains the slice length criteria, for the secondary site (block 1015) and discards usage of the additional space (block 1016). The mechanism then marks the region for background copy threads to copy to that slice on the identified secondary site (block 1008) and determines whether the site is the last secondary peer site (block 1009). If the site is not the last secondary site, then operation returns to block 1005 in FIG. 10A to calculate the storage space for replication for the next site.

If the available space is equal to the slice length plus the difference in block 1014, the mechanism sets a new slice length for the secondary site (block 1017) and then marks the region for background copy threads to copy to that slice on the identified site (block 1008) and determines whether the site is the last secondary site (block 1009). If the site is not the last secondary site, operation returns to block 1005 in FIG. 10A to calculate the storage space for replication for the next site.

If the site is the last secondary site in block 1009, the mechanism establishes the pontoon sites in relationship with the master secondary site (block 1018). The mechanism relays, from the primary site to the master secondary site, information of slice length of blocks to be copied to the master secondary site from each pontoon site to the master secondary site (block 1019). The mechanism starts background copy threads from the primary site to each subsidiary peer (pontoon) site and the master secondary site (block 1020).

Once copy operation completes, the mechanism enables consolidated read view logic on the master secondary site (block 1021). The mechanism then starts the copy process from each pontoon site to the master secondary site (block 1022). The mechanism verifies data from each pontoon site is copied to the master secondary site (block 1023). Thereafter, operation ends (block 1024).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for managing replication or migration of large and critical data from a primary site to a secondary site. The mechanisms of the illustrative embodiments address the concerns of security and data privacy using third-party or storage cloud services, because each subsidiary site only has a fraction of the primary image being replicated rather than the entire data. Any unwarranted or unauthorized access to the data on subsidiary sites or any compromise on access security would only provide partial data, which would be useless. Each participating site, excluding the master secondary and primary sites, acts as a pontoon or stepping stone. The subsidiary peer sites collect the defined set of data and then at some appropriate point in time, the data is copied from the subsidiary peer sites to the master secondary site.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for data replication, comprising:
   dividing a set of data to be replicated into a plurality of slices, wherein each slice of the plurality of slices is to be copied from a primary site to a master secondary site within a plurality of secondary sites, wherein the plurality of secondary sites comprises the master secondary site and at least one subsidiary peer site;
   copying the plurality of slices from the primary site to the plurality of secondary sites such that the master secondary site stores a first slice of the set of data and the at least one subsidiary peer site stores at least one remaining slice of the set of data;
   responsive to completion of copying the plurality of slices to the plurality of secondary sites, initiating copying of the at least one remaining slice of the set of data from the at least one subsidiary peer site to the master secondary site and enabling logic for a consolidated read view of the set of data, wherein the logic presents a consolidated read view of the set of data to a client as if the set of data is stored at the master secondary site; and
   responsive to completion of copying the at least one remaining slice from the at least one subsidiary peer site to the master secondary site, disabling the logic for the consolidated read view of the set of data.

2. The method of claim 1, wherein the primary site comprises a storage cloud.

3. The method of claim 1, wherein the master secondary site comprises a storage cloud.

4. The method of claim 1, wherein the at least one subsidiary peer site comprises a storage cloud.

5. The method of claim 1, wherein dividing the set of data into the plurality of slices comprises:
   determining a number of secondary sites;
   determining a storage space per secondary site; and for each given secondary site, responsive to available storage space of the given secondary site being greater than or equal to the storage space, marking a region of storage space of the given secondary site for replication storage.

6. The method of claim 5, wherein dividing the set of data into the plurality of slices further comprises:
responsive to available storage space of the given secondary site not being greater than or equal to the storage space, determining a space difference; and
responsive to a next secondary site having additional storage space, shifting a next slice to start on previous slice end and setting a new slice length for the given secondary site and the next secondary site.

7. The method of claim 1, further comprising:
establishing a partnership between the primary site and each of the plurality of secondary sites; and
establishing a partnership between each of the at least one subsidiary peer site and the master secondary site.

8. The method of claim 1, wherein initiating copying of the at least one remaining slice of the set of data to the master secondary site comprises initiating a background copy thread on each of the at least one subsidiary peer site.

9. The method of claim 1, further comprising:
verifying data from each of the at least one subsidiary peer site is copied to the master secondary site.

10. A computer program product comprising a non-transitory computer readable storage medium having a computer readable program stored therein, wherein the computer readable program, when executed on a computing device, causes the computing device to:
divide a set of data to be replicated into a plurality of slices, wherein each slice of the plurality of slices is to be copied from a primary site to a master secondary site within a plurality of secondary sites, wherein the plurality of secondary sites comprises the master secondary site and at least one subsidiary peer site;
copy the plurality of slices from the primary site to the plurality of secondary sites such that the master secondary site stores a first slice of the set of data and the at least one subsidiary peer site stores at least one remaining slice of the set of data;
responsive to completion of copying the plurality of slices to the plurality of secondary sites, initiate copying of the at least one remaining slice of the set of data from the at least one subsidiary peer site to the master secondary site and enable logic for a consolidated read view of the set of data, wherein the logic presents a consolidated read view of the set of data to a client as if the set of data is stored at the master secondary site; and
responsive to completion of copying the at least one remaining slice from the at least one subsidiary peer site to the master secondary site, disable the logic for the consolidated read view of the set of data.

11. The computer program product of claim 10, wherein at least one of the primary site or the master secondary site comprises a storage cloud.

12. The computer program product of claim 10, wherein the at least one subsidiary peer site comprises a storage cloud.

13. The computer program product of claim 10, wherein dividing the set of data into the plurality of slices comprises:
determining a number of secondary sites;
determining a storage space per secondary site; and
for each given secondary site, responsive to available storage space of the given secondary site being greater than or equal to the storage space, marking a region of storage space of the given secondary site for replication storage.

14. The computer program product of claim 13, wherein dividing the set of data into the plurality of slices further comprises:
responsive to available storage space of the given secondary site not being greater than or equal to the storage space, determining a space difference; and
responsive to a next secondary site having additional storage space, shifting a next slice to start on previous slice end and setting a new slice length for the given secondary site and the next secondary site.

15. The computer program product of claim 10, wherein the computer readable program further causes the computing device to:
verify data from each of the at least one subsidiary peer site is copied to the master secondary site.

16. An apparatus, comprising:
a processor; and
a memory coupled to the processor, wherein the memory comprises instructions which, when executed by the processor, cause the processor to:
divide a set of data to be replicated into a plurality of slices, wherein each slice of the plurality of slices is to be copied from a primary site to a master secondary site within a plurality of secondary sites, wherein the plurality of secondary sites comprises the master secondary site and at least one subsidiary peer site;
copy the plurality of slices from the primary site to the plurality of secondary sites such that the master secondary site stores a first slice of the set of data and the at least one subsidiary peer site stores at least one remaining slice of the set of data;
responsive to completion of copying the plurality of slices to the plurality of secondary sites, initiate copying of the at last one remaining slice of the set of data from the at least one subsidiary peer site to the master secondary site and enable logic for a consolidated read view of the set of data, wherein the logic presents a consolidated read view of the set of data to a client as if the set of data is stored at the master secondary site; and
responsive to completion of copying the at least one remaining slice from the at least one subsidiary peer site to the master secondary site, disable the logic for the consolidated read view of the set of data.

17. The apparatus of claim 16, wherein the instructions further cause the processor to:
verify data from each of the at least one subsidiary peer site is copied to the master secondary site.

18. The apparatus of claim 16, wherein at least one of the primary site or the master secondary site comprises a storage cloud.

19. The apparatus of claim 16, wherein the at least one subsidiary peer site comprises a storage cloud.

20. The apparatus of claim 16, wherein dividing the set of data into the plurality of slices comprises:
determining a number of secondary sites;
determining a storage space per secondary site;
for each given secondary site, responsive to available storage space of the given secondary site being greater than or equal to the storage space, marking a region of storage space of the given secondary site for replication storage;
responsive to available storage space of the given secondary site not being greater than or equal to the storage space, determining a space difference; and responsive to a next secondary site having additional storage space, shifting a next slice to start on previous slice end and setting a new slice length for the given secondary site and the next secondary site.

* * * * *